United States Patent
Barry et al.

(10) Patent No.: US 8,145,612 B2
(45) Date of Patent: Mar. 27, 2012

(54) SYSTEM AND METHOD FOR MULTI-STAGE TAIL NUMBER ACQUISITION

(75) Inventors: James Barry, Madison, CT (US); James Cole, East Setauket, NY (US); Matthew Marcella, West Hempstead, NY (US); Ron Dunsky, Brooklyn, NY (US)

(73) Assignee: PASSUR Aerospace, Inc., Stamford, CT (US)

( * ) Notice: Subject to any disclaimer, the term of this patent is extended or adjusted under 35 U.S.C. 154(b) by 1546 days.

(21) Appl. No.: 11/590,423

(22) Filed: Oct. 31, 2006

(65) Prior Publication Data

US 2007/0124033 A1 May 31, 2007

Related U.S. Application Data

(60) Provisional application No. 60/731,691, filed on Oct. 31, 2005.

(51) Int. Cl.
*G06F 17/30* (2006.01)

(52) U.S. Cl. .......................... 707/705; 707/758

(58) Field of Classification Search .............. 707/802, 707/705, 758, 768
See application file for complete search history.

(56) References Cited

U.S. PATENT DOCUMENTS

| | | | |
|---|---|---|---|
| 6,173,159 B1 * | 1/2001 | Wright et al. | 455/66.1 |
| 6,259,977 B1 * | 7/2001 | Mayer et al. | 701/14 |
| 6,448,929 B1 * | 9/2002 | Smith et al. | 342/456 |
| 6,462,697 B1 * | 10/2002 | Klamer et al. | 342/36 |
| 2002/0087873 A1 * | 7/2002 | Zunke | 713/193 |
| 2003/0177044 A1 * | 9/2003 | Sokel et al. | 705/5 |
| 2004/0162829 A1 * | 8/2004 | Gabos et al. | 707/10 |
| 2005/0246208 A1 * | 11/2005 | Langerman | 705/5 |
| 2006/0129437 A1 * | 6/2006 | Lee et al. | 705/5 |

* cited by examiner

*Primary Examiner* — Cheryl Lewis
(74) *Attorney, Agent, or Firm* — Fay Kaplun & Marcin, LLP

(57) ABSTRACT

A system and method for receiving data on an aircraft, the data including a tail number of the aircraft, storing the data in a database, receiving a request including further data, the further data being related to the aircraft, querying the data in the database using the further data and returning the tail number of the aircraft.

14 Claims, 4 Drawing Sheets

US 8,145,612 B2

SYSTEM AND METHOD FOR MULTI-STAGE TAIL NUMBER ACQUISITION

PRIORITY CLAIM/INCORPORATION BY REFERENCE

This application claims the benefit of U.S. Provisional Patent Application 60/731,691 filed on Oct. 31, 2005 and entitled "Multi-Stage Tail Number Acquisition" and is expressly incorporated herein, in its entirety, by reference.

BACKGROUND

An aircraft registration is a unique alphanumeric string that identifies a civilian aircraft. All ICAO countries require aircraft over a certain weight to be registered with a national aviation authority. Upon registration, the aircraft receives its unique "registration" which must be displayed prominently on the aircraft. Since for airplanes, this is usually the aft fuselage, the registration is often referred to as the tail number.

The aircraft registration is made up of a prefix selected from the countries call sign prefix allocated by the ITU (making the registration a quick way of determining the country of origin) and the registration suffix. Depending on the country of registration, this suffix is a numeric or alphanumeric code and consists of one to five digits or characters respectively.

As aircraft land, it is useful to gather the aircraft's tail number for a variety of purposes, e.g., security, billing for landing, flight status, etc. However, since the tail number is physically written on the aircraft, 100% effective monitoring would require a person to physically read and record each tail number as the aircraft lands. This is virtually impossible to accomplish for a variety of reasons.

SUMMARY OF THE INVENTION

A method for receiving data on an aircraft, the data including a tail number of the aircraft, storing the data in a database, receiving a request including further data, the further data being related to the aircraft, querying the data in the database using the further data and returning the tail number of the aircraft.

A system having a multi-stage tail number database storing data relating to a plurality of aircraft, the data including a tail number for at least a portion of the aircraft and a correlation engine receiving the data from a plurality of data feeds, the correlation engine correlating the data received from the plurality of data feeds and populating the data into the multi-stage tail number database.

A system having a memory storing a set of instructions and a processor for executing the instructions. The instruction being operable to receive data on an aircraft, the data including a tail number of the aircraft, store the data in a database, receive a request including further data, the further data being related to the aircraft, query the data in the database using the further data and return the tail number of the aircraft.

DETAILED DESCRIPTION

Figure 1:
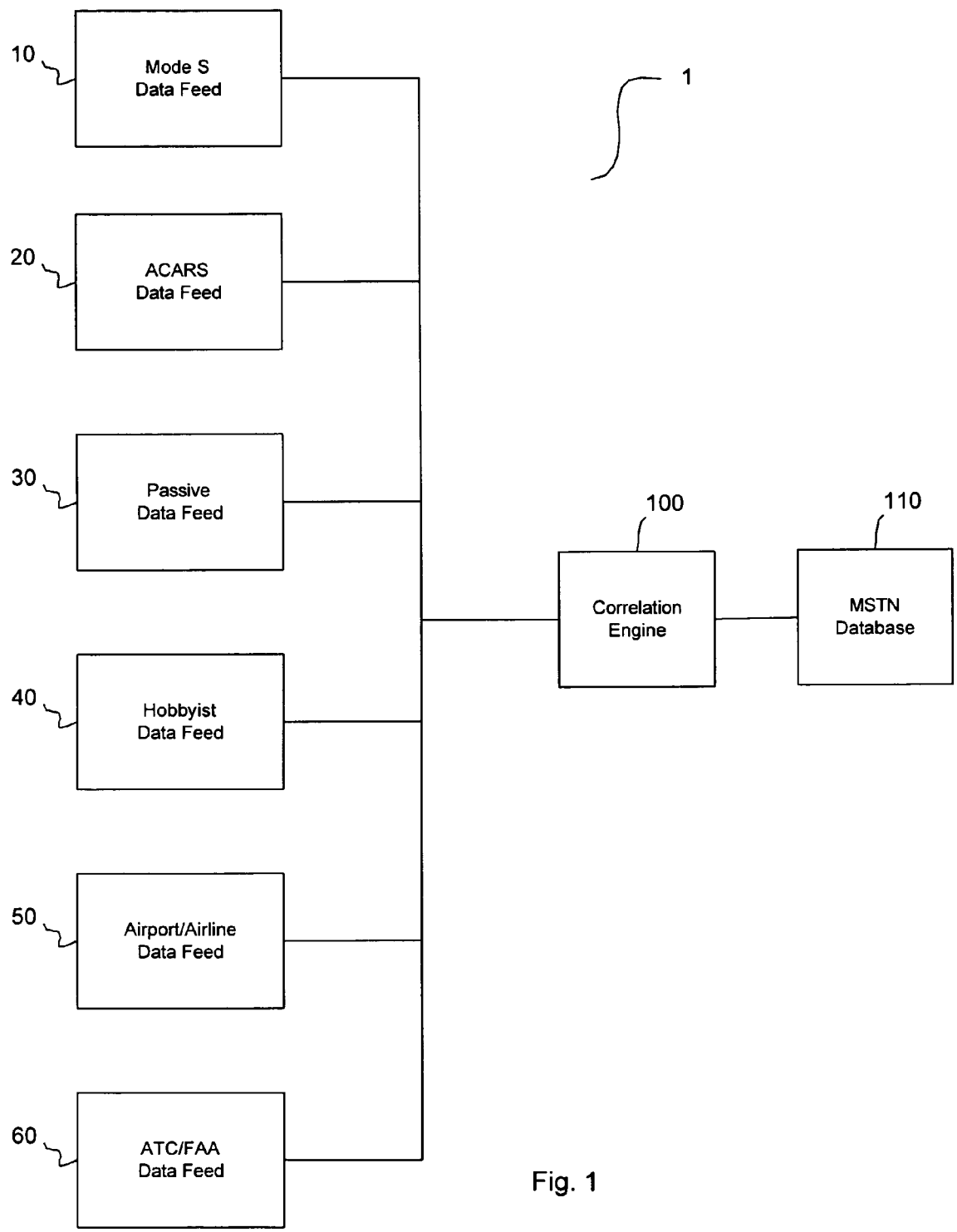
FIG. 1 shows an exemplary embodiment of a system for populating a Multi-Stage Tail Number database according to the present invention.

The present invention may be further understood with reference to the following description and to the appended drawings, wherein like elements are referred to with the same reference numerals. The present invention relates to accurately correlating tail numbers with their corresponding aircraft. In this description, the providing of aircraft tail numbers will be described with reference to landing aircraft (e.g., at an airport). However, those skilled in the art will understand that through the use of data sources described herein (or other data sources that may be used consistent with the exemplary processes described herein) the tail number of an aircraft in any location may be determined (e.g., in-flight).

FIG. 1 shows a block diagram of an exemplary system 1 for correlating aircraft with their tail numbers. In FIG. 1, data feeds 10-60 feed data to a correlation engine 100. The correlation engine 100 correlates the data received from each of these data feeds 10-60 and creates a Multi-Stage Tail Number ("MSTN") database 110. As will be described in greater detail below, the MSTN database 110 may be accessed by users to determine a tail number for a particular aircraft. Those skilled in the art will know the database transfer protocols and methods of populating and extracting information from a database (e.g. SQL, Microsoft Access, Oracle, etc.). Each of the data feeds 10-60 and the correlation engine 100 will also be described in greater detail below.

It should be understood that the following description with respect to FIG. 1 is describing the populating of the MSTN database 110 with accurate tail number correlation data. A system and method for retrieving this tail number information for an aircraft when, for example, the aircraft lands at a particular airport, will be described in greater detail below.

Those skilled in the art will also understand that in the following description, the data feeds will be described with reference to the type of data that may be provided within the system. The described data feeds are not intended to describe the physical system that may provide the information. For example, one of the data feeds described below will be the Mode S data feed. The actual Mode S signals may be received from the active radar system that is interrogating the aircraft Mode S transponder and receiving the responses from the Mode S transponder. However, the Mode S signals may also be received from a passive secondary surveillance radar system that monitors transmissions from the aircraft. Thus, the actual physical system that collects the information that is described as being provided by the exemplary data feeds is not important to the present invention.

The first exemplary data feed shown in FIG. 1 is the Mode S data feed 10. The Federal Aviation Administration (FAA) requires all passenger carrying aircraft over 30 seats be equipped with a "Mode S" transponder. The Mode S transponders transmit a unique a unique 24-bit binary address for each aircraft. The 24-bit binary address may be derived from the tail number of the aircraft. However, not every country publishes the correlation algorithm to derive the 24-bit address from the tail number. In addition, some countries use a database where the number is assigned without a correlation algorithm. This database may be published or unpublished. Further, the Mode S transmission may not be received correctly in every situation because of, for example, interference, noise, or any other phenomena that prevents proper reception of over the air signals. Thus, the 24-bit address received at the tracking station may not be the actual address of the aircraft interrogated.

Moreover, as described above, even in the United States, not all aircraft are required to be equipped with Mode S transponders. In certain countries, Mode S transponders are not required on any aircraft. Thus, while the Mode S transponder transmissions may be useful in correlating aircraft with their assigned tail numbers, the Mode S data feed 10 by itself cannot provide information to correlate tail numbers for all aircraft.

The information received from the Mode S data feed 10 may be input into the correlation engine 100. For those aircraft where the tail number can be identified from the 24-bit Mode S address, the correlation engine 100 may populate the MSTN database 110. For example, in situations where there is a published country database that correlates 24-bit Mode S addresses with tail numbers, this information may be populated into the MSTN database 110. Thus, in this example, the Mode S data feed 10 is not a radar system that receives the Mode S data, but rather a database input having the correlation information. In another example, the system providing the Mode S data for the Mode S data feed 10 may have the algorithm that correlates the 24-bit address with the tail number. This information may be provided to the correlation engine 100 for population into the MSTN database 110.

In the above described examples, the correlation engine 100 is providing the populating function, but is not providing a correlation function. In a further example, the algorithm for converting the 24-bit address to the tail number may be included in the correlation engine 100. In such an example, the correlation engine may receive the raw 24-bit address from the Mode S data feed 10 and perform the correlation by converting the address using the algorithm. The correlation engine 100 may then populate this information into the MSTN database 110. This provides an example of the correlation engine 100 correlating data from a single data feed using information stored with in the correlation engine 100. In further examples, it will be seen that the correlation engine 100 may use data from two or more sources (including data feeds 10-60 and MSTN database 110) to correlate an aircraft to its tail number.

The second exemplary data feed is an Aircraft Communications Addressing and Reporting System ("ACARS") feed 20. A person or a system on board may create a message and send it via ACARS to a system or user on the ground, and vice versa. Messages may be sent either automatically and manually. A typical ACARS message may include for example, a mode of the transmission, the tail number of the aircraft, a Block ID, a flight number, etc. Those skilled in the art will understand that the ACARS message may include any type of information. The ACARS message may be fed into the correlation engine 100 because it may include information that can be used to correlate an aircraft with its tail number.

From the above typical information it can be seen that the actual tail number may be part of the ACARS message. Again, this information itself may be used to identify the tail number. However, the ACARS message does not need to include the actual tail number of the aircraft to be useful for correlation purposes. For example, the ACARS message may include the flight number. Using the flight number from the ACARS message, other information may be derived that leads to the tail number. However, in any case, the information from the ACARS data feed 20 will also be populated into the MSTN database 110.

In some instances, the data input by the ACARS data feed 20 (or any other data feed) may be stored in a previously created record or a new record may be created. For example, using the data feeds 10 and 20 already described, the correlation engine 100 may receive data from the Mode S data feed 10 that includes the 24-bit address. The correlation engine 100 may include the algorithm to convert the 24-bit address into the tail number. Thus, the correlation engine 100 may populate a record into the MSTN database 110 that includes the 24-bit address and the tail number. The correlation engine may also receive data from the ACARS data feed 20 for the same aircraft that includes the tail number, the type of aircraft and the flight number. Thus, the correlation engine 100 may correlate the tail number derived from the Mode S data feed 10 with the tail number provided by the ACARS data feed 20 and populate the existing record (i.e., the record created from the Mode S data) with the data from the ACARS message (e.g., type of aircraft and flight number).

In the above example, the common information from the data feeds 10 and 20 used to populate a common record was the tail number. However, the common information may be any type of data that is provided by two different data feeds, e.g., flight number, etc. Another issue raised by the above example, is that the MSTN database 110 may not be static. That is, while the tail number of a particular aircraft may remain static for long periods of time (e.g., as long as the aircraft is owned by the same entity in the same country), information such as flight number may change multiple times during a single day. Thus, the correlation engine 100 may need to constantly update the MSTN database 110 as needed.

In the above example, it can also be seen that it may be possible to generate a confidence level for any particular record within the MSTN database 110. For example, where the record is generated using information from only a single data feed, such a record may have a lower level of confidence than where the record has been generated by combining information from two or more data feeds. In addition, where two or more data fields from different data feeds overlap, this may lead to a higher level of confidence in the record. Those of skill in the art will understand that there may be numerous manners of assigning various levels of confidence to records within the MSTN database 110. These confidence levels may be used when data from a record is provided from the MSTN database 110 to users of the database.

It should also be noted that in the above description, it was stated that the information from the data feeds 10 and 20 may include the tail number. However, even if the information does not include the tail number, the data may still be correlated and recorded in the MSTN database, because there may be further data that can be added that will help in correlating an aircraft to a tail number.

The third exemplary data feed is a passive data feed 30. As described above, it is common for airports have passive radar systems in addition to the active radar systems. These passive systems collect data on aircraft that are in the vicinity of the airport (incoming or departing). The data that may be collected includes, but is not limited to, the time (e.g., UNIX time), the x-position, the y-position, altitude, x-velocity component, y-velocity component, z-velocity component, the speed, the flight number, the airline, the aircraft type, etc. Similar to the data from the data feeds 10 and 20, the data collected by the passive system may be input into the correlation engine 100 via the passive data input feed 30. This data may be correlated by the correlation engine 100 and either input into an existing record (for correlated data) or create a new record for uncorrelated data and populated into the MSTN database 110.

The fourth exemplary data feed is a hobbyist data feed 40. Aircraft hobbyists located throughout the world continually track and monitor the behavior of aircraft. The data collected by these hobbyists may be collected, correlated by the correlation engine 100 and populated into the MSTN database 110.

The fifth exemplary data feed is an airport/airline data feed 50. Airports and airlines may have access to data that is collected by various sources and/or data that is in their own databases (e.g., flight schedules, etc.). This data may form another data feed 50 that can be input into the correlation engine 100 and be used to populate the MSTN database 110.

The sixth exemplary data feed is an Air Traffic Control ("ATC")/FAA data feed 60. As will be understood by those skilled in the art, the ATC/FAA collects certain data on aircraft as the aircraft is in flight. In some instances, the ATC/FAA makes this data available to authorized vendors. This data may form another data feed 50 that can be input into the correlation engine 100 and be used to populate the MSTN database 110.

It should be noted that the data feeds may or may not be real time data feeds. For example, the ATC/FAA data feeds may be delayed because of security concerns. However, the data from these delayed data feeds may still be populated into the MSTN database 110 because, while the goal is to identify the tail number in real time, it may be possible to identify a tail number at a later time when additional information is populated into the MSTN database. In addition, this later added data may be used to identify the tail number of same aircraft at a different time, e.g., when the aircraft shows lands at a new airport.

The above description provided six exemplary data feeds 10-60 that may be used to populate the MSTN database 110. However, those skilled in the art will understand that there may be other data feeds that may be input into the correlation engine 100 to populate the MSTN database 110.

Figure 2:
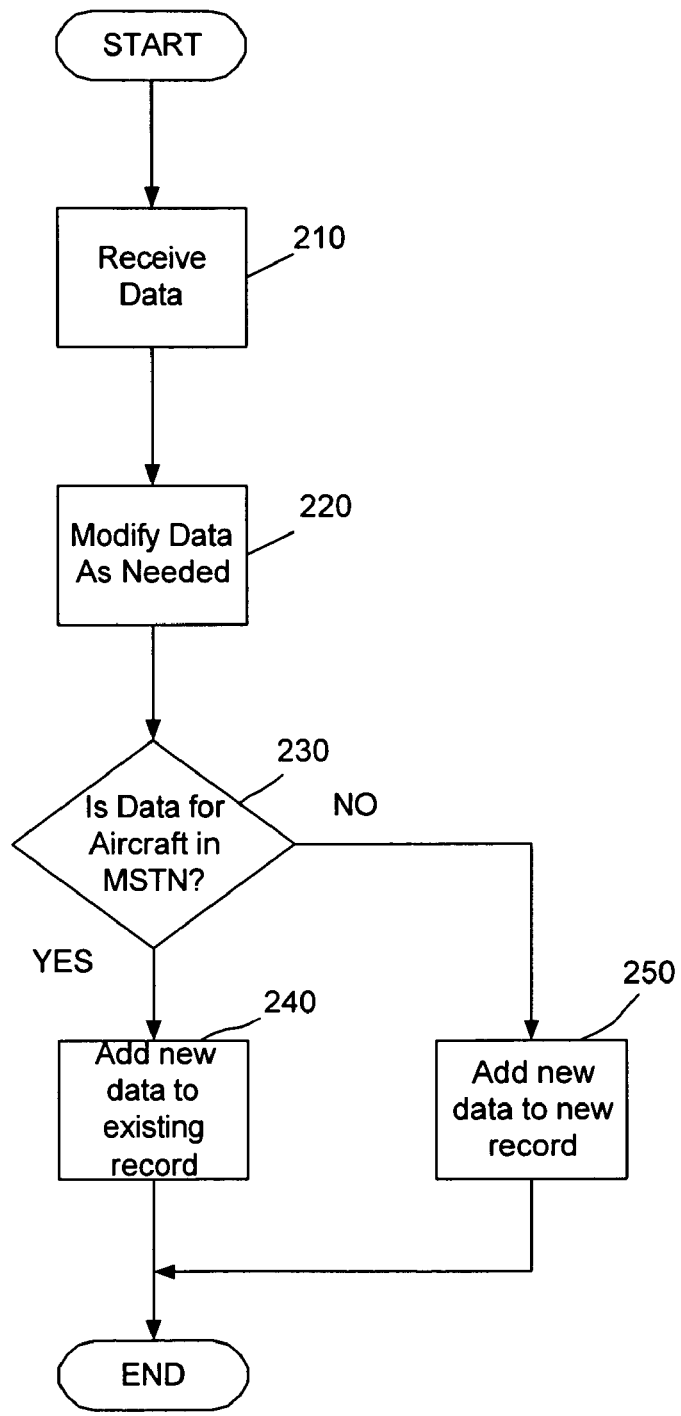
FIG. 2 shows an exemplary method for populating the Multi-Stage Tail Number database according to the present invention.

FIG. 2 shows an exemplary method 200 for populating the MSTN database 110. The method 200 will be described with reference to the components described in FIG. 1. In step 210, the correlation engine 100 will receive data from one or more of the data feeds 10-60. In step 220, the correlation engine 100 will modify this received data as needed. For example, as described above, the correlation engine 100 may receive the 24-bit address data from the Mode S data feed 10. However, in order for this data to be useful, the correlation engine 100 may have to modify the data by for example, applying the correct algorithm to extract the tail number from the 24-bit address.

In another example, data received from one data feed may be in a different format or may have a different label or identifier. For example, data received from one source may be in the form of a spreadsheet, the correlation engine 100 may convert the data to, for example, text data for population into the MSTN database 110. In another example, the data received for, for example, aircraft type may have a label that is inconsistent with the label that is used by other data feeds or the MSTN database 110. The correlation engine 100 may understand that the data was received from a data feed that has a non-conventional manner of labeling the data and the correlation engine 100 may convert the data from the non0conventional labels to the conventional label for population into the MSTN database 110.

In step 230, the correlation engine determines whether the data received from the data feed is for an aircraft that already includes a record in the MSTN database 110 or a new aircraft that does not include a record in the MSTN database 110. As described above, the purpose of the MSTN database 110 is to provide accurate tail numbers for identified aircraft. However, in different situations, the entity that desires to identify the tail number of the aircraft may have different data from which the tail number may be derived and/or looked-up. Thus, the more data that is included in the MSTN database 110, the more likely it will be that the user will be able to identify the tail number of the aircraft based on the available data.

Thus, as new data is added to the MSTN database 110, it is important that the new data is correctly correlated to the record for the aircraft with which the data is associated. The correlation engine 100 in step 230 performs this correlation. Specifically, the correlation engine 100 reviews the newly received data and determines if the data matches any data previously stored in the MSTN database 110 for an aircraft. The match or matches may be based on any field of stored data in the MSTN database 110.

If the new data matches previously stored data in the MSTN database 110, the new data is added to an existing record in the MSTN database in step 240. As described above, the type of match and/or the number of matching fields may determine a confidence level of the match. In addition, those skilled in the art will understand that not every match will result in a correlation of data. For example, a record for an aircraft may include a flight number. However, the same flight number on a different day may not be the same aircraft, so even if the data matches, the correlation engine may not mark this as a match if it is the only filed that matches in the data. If the new data does not match existing data in the MSTN database 110, the new data is added to a new record in step 250.

Those skilled in the art will understand that the method 200 is an iterative process and the population of data into the MSTN database 110 may be continuous so that the MSTN database 110 has the most updated data.

Figure 3:
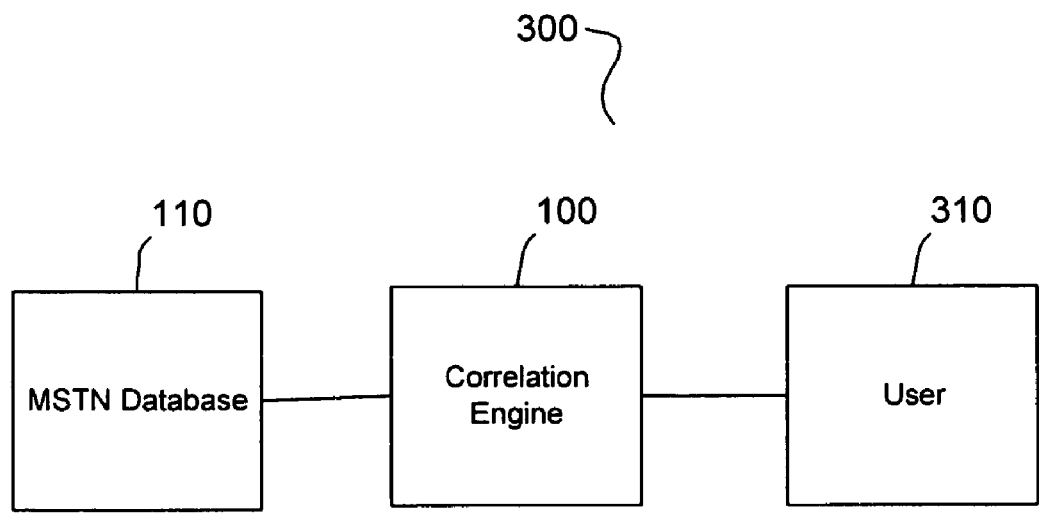
FIG. 3 shows the exemplary system for retrieving tail number information from the Multi-Stage Tail Number database according to the present invention.

FIG. 3 shows the exemplary system 300 for retrieving tail number information from the MSTN database 110. In this exemplary embodiment, it is considered that the MSTN database 110 has been sufficiently populated that it may provide tail number information to users of the system. The MSTN database 110 may be accessed directly, or via a communication network which may be, for example, the Internet, a corporate intranet, etc. The exemplary embodiment of the present invention is described as a web-based system. However, those skilled in the art will understand that there may be any number of other manners of implementing the present invention in embodiments that are not web based. The MSTN database 110 may be stored, for example, on a standard PC based server system running an operating system such as LINUX. Those skilled in the art will understand that any computing platform may be used for storing and accessing the MSTN database 110.

Thus, a user of the system desires to determine the tail number of an aircraft. In this example, the user may be considered to be an operator of an airport desiring to identify the tail number of an aircraft that has just landed at the airport. Thus, the user, through a user terminal 310, will access the MSTN database 110 to determine the tail number of the aircraft. The user terminal 310 may present, for example, a graphical user interface ("GUI") for making the request. In the alternative, the request may be automatically generated and sent to the MSTN database 110.

As described above, the correlation engine 100 may be used to populate the MSTN database 110. However, the correlation engine 100 may also be used to query the MSTN database 110 based on the request from the user. Those skilled in the art will understand that the populating and querying functions may be separated into different functional modules.

The request for the identifying of the tail number will include data that the user has for the aircraft for which the identification is requested. The data may be from the same data feeds describe above, or from different data feeds. The correlation engine 100 will receive this data and query the MSTN database 110 to determine if the data matches any of the records in the MSTN database 110. If the data matches, the correlation engine 100 will return the tail number data to the user terminal 310.

As described above, in this exemplary embodiment, it is contemplated that the MSTN database 110 is a web-based service wherein the MSTN database 110 is stored at a central location. This storage at a central location will allow the correlation engine 100 to receive data from numerous data feeds and create a comprehensive MSTN database that includes a large number of the world's aircraft. In a very inclusory example, the central location may receive the six exemplary data feeds described above from every airport in the United States. Thus, the MSTN database 110 could be populated with data from these data feeds for every airport. Therefore, when one of those airports attempts to identify the tail number of an aircraft, the airport will benefit from the data collected at every airport.

Of course, other methods of populating and distributing the MSTN database 110 may also be used. For example, each user may have their own copy of the MSTN database 110 and correlation engine 100 query function. Thus, the user may query the MSTN database 110 locally. In this example, the MSTN database 110 may still be populated at the central location using data from multiple locations. The updated MSTN database 110 may then be downloaded from the central location to the local users (e.g., daily, weekly, monthly, etc.).

Figure 4:
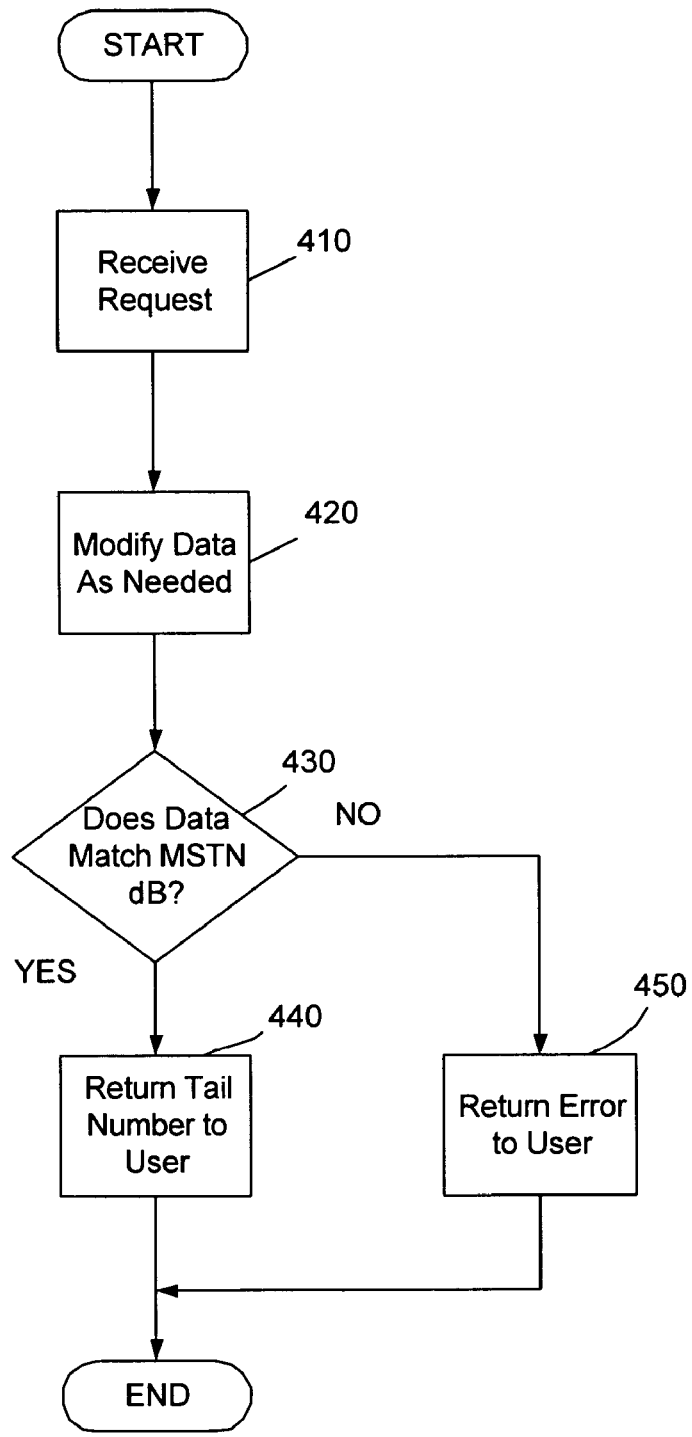
FIG. 4 shows an exemplary method for querying the Multi-Stage Tail Number database according to the present invention.

FIG. 4 shows an exemplary method 400 for querying the MSTN database 110. The exemplary method 400 will be described with reference to the components described with reference to FIG. 3. In step 410, the correlation engine 100 receives the request from the user. As described above, the request will be received with some or all of the data that the user has to identify the aircraft. For example, the user may be equipped to receive Mode S signals from the aircraft. Thus, the request received from the user may include the 24-bit address for the aircraft. However, any other type of data that the user has for the aircraft may also be sent with the request.

In an exemplary embodiment, the user is a user of a passive radar system that is gathering flight information. However, the passive radar system data collection and display cannot, by itself, discern the tail numbers of all the aircraft that it is monitoring. Thus, the user of the passive radar system desires to have access to the MSTN database 110 to determine the tail numbers of those aircraft that have been identified by the passive radar system, but the tail number has not been identified. Thus, the user may send the request that includes the data collected by the passive radar system to the system of the exemplary embodiment to request the tail number from the MSTN database 110. Those skilled in the art will understand that when it is described that the user will send the request, it may be a manual request if the user notices that the tail number is missing from the collected data or it may be an automatic request that is programmed into the passive radar system to send the request when it collects data that is missing tail number information.

In step 420, the correlation engine 100 may modify the data as needed to perform the query. For example, as described above, the data may be received in a non-conventional form or format that the correlation engine 100 needs to modify in order to query that MSTN database. In another example, the correlation engine 100 may have to parse the data received with the request so that a query of multiple fields may be accomplished.

In step 430, the correlation engine 100, using the data included in the request, queries the MSTN database 110. The correlation engine 100 will query the fields of the MSTN database 110 that correspond to the data received in the request. If the data matches one of the records in the MSTN database 110, the correlation engine will return the tail number recorded in that record to the user in step 440.

If the data does not match any of the data in the MSTN database 110, the correlation engine 100 in step 450 will return an error to the user indicating that the data sent with the request does not match a record in the MSTN database 110, or if it matches data that does not have an associated tail number. Furthermore, it should also be noted that when a query of the MSTN database 110 results in a no-match for identifying the tail number, the exemplary embodiment may queue the tail number request for further processing as new data is populated into the MSTN database 110. This queue may be maintained for any length of time and the request may be re-processed at a later time.

As described above, each record in the MSTN database 110 may include a confidence level based on how confident the correlation engine 100 is that the data is correct in the record. In addition, another confidence level may be generated based on the level of matching based on the data in the request and the type of number of matching fields in the MSTN database 110. Thus, along with the tail number, one or more confidence levels may be returned to the user.

It should also be noted that from the above described examples, those skilled in the art will understand that the data sent with the request may also be used to populate the MSTN database. Thus, each request may also be a data feed that the correlation engine may use to further populate the MSTN database 110.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   receiving data on an aircraft from a plurality of data sources, the data including a tail number of the aircraft;
   correlating a first data from a first data source with a second data from a second data source to create correlated data on the aircraft;
   storing the correlated data in a database, wherein, if the database includes a previously stored record for the aircraft, the correlated data is used to modify the previously stored data and stored in the previously stored record, and wherein, if the database does not include a previously stored record for the aircraft, the correlated data is stored in a new record;
   receiving a request including further data, the further data being related to the aircraft;
   querying the correlated data in the database using the further data; and
   returning the tail number of the aircraft based on the querying.

2. The method of claim 1, wherein the data sources include at least one of a Mode S data feed, an ACARS data feed, a passive data feed, a hobbyist data feed, an airport data feed, an airline data feed, an ATC data feed and an FAA data feed.

3. The method of claim 1, further comprising:
receiving supplemental data on the aircraft; and
storing the supplemental data in the database.

4. The method of claim 1, further comprising:
modifying the data prior to storing the data.

5. The method of claim 1, wherein the further data is stored in the database.

6. A system, comprising:
a multi-stage tail number database storing data relating to a plurality of aircraft, the data including a tail number for at least a portion of the aircraft; and
a correlation engine receiving the data from a plurality of data sources, the correlation engine correlating a first data received from a first data source with a second data received from a second data source to create correlated data on the aircraft and populating the data into the multi-stage tail number database,
wherein, the database includes a record for each aircraft and when correlated data is related to one of the plurality of aircrafts, the record for the corresponding aircraft is modified to include the correlated data,
wherein, when correlated data is received for an aircraft that does not have a corresponding record, a new record is created in the database and the correlated data is stored in the new record.

7. The system of claim 6, wherein the correlation engine receives a request including request data, the request data relating to one of the plurality of aircraft, the correlation engine querying the data stored in the database using the request data and returning the tail number of the one of the plurality of aircraft.

8. The system of claim 7, further comprising:
a user interface for receiving the returned tail number.

9. The system of claim 7, wherein the request data is stored in the database.

10. The system of claim 8, wherein the user interface is further used to generate the request.

11. The system of claim 6, wherein the plurality of data sources includes at least one of a Mode S data feed, an ACARS data feed, a passive data feed, a hobbyist data feed, an airport data feed, an airline data feed, an ATC data feed and an FAA data feed.

12. The system of claim 6, wherein the correlated data stored for each aircraft includes a confidence level.

13. The system of claim 6, wherein the database is accessible via a computer network.

14. A system comprising a memory storing a set of instructions and a processor for executing the instructions, the instruction being operable to:
receive data on an aircraft from a plurality of data sources, the data including a tail number of the aircraft;
correlate a first data from a first data source with a second data from a second data source to create correlated data on the aircraft;
store the correlated data in a database, wherein, if the database includes a previously stored record for the aircraft, the correlated data is used to modify the previously stored data and stored in the previously stored record, and wherein, if the database does not include a previously stored record for the aircraft, the correlated data is stored in a new record;
receive a request including further data, the further data being related to the aircraft;
query the correlated data in the database using the further data; and
return the tail number of the aircraft based on the querying.

* * * * *